US011207737B2

(12) United States Patent
Britton et al.

(10) Patent No.: US 11,207,737 B2
(45) Date of Patent: Dec. 28, 2021

(54) INLINE TOOL HOLDERS

(71) Applicant: Toyota Motor Engineering & Manufacturing North America, Inc., Plano, TX (US)

(72) Inventors: David A. Britton, Florence, KY (US); Charlie H. Reynolds, Cynthiana, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/561,932

(22) Filed: Sep. 5, 2019

(65) Prior Publication Data

US 2021/0069840 A1 Mar. 11, 2021

(51) Int. Cl.

*B23B 31/08* (2006.01)
*B23Q 1/03* (2006.01)
*B23B 31/117* (2006.01)

(52) U.S. Cl.

CPC ......... *B23B 31/083* (2013.01); *B23B 31/1175* (2013.01); *B23Q 1/03* (2013.01); *Y10T 279/17914* (2015.01)

(58) Field of Classification Search

CPC ..... Y10T 279/17914; Y10T 279/17905; B23B 31/08; B23B 31/083; B23B 31/1175; B23B 2260/008; B23B 2260/0085; B25H 1/0028; B23Q 1/03; F16D 1/076; F16D 1/033; F16C 19/44; F16C 19/30; F16C 17/04; F16C 17/26

USPC ................................. 173/132, 213; 403/337

See application file for complete search history.

(56) References Cited

U.S. PATENT DOCUMENTS 1,845,425 A * 2/1932 Larson .................... F16C 19/30 384/620
2,839,953 A * 6/1958 Hanger ................... B23B 49/00 408/72 R
4,884,821 A * 12/1989 Dietrich ................ B23B 31/201 279/143
5,152,202 A 10/1992 Strauss (Continued)

FOREIGN PATENT DOCUMENTS

CN 107175543 B 9/2017
CN 207057774 U 3/2018

(Continued)

OTHER PUBLICATIONS

Machine Translation, DE 3535601 A1, Fauth, O., Apr. 9, 1978. (Year: 1987).*

(Continued)

*Primary Examiner* — Eric A. Gates
*Assistant Examiner* — Chwen-Wei Su
(74) *Attorney, Agent, or Firm* — Dinsmore & Shohl LLP

(57) ABSTRACT

An inline tool holder including a shaft collar, a mounting plate, a first enclosure, and a second enclosure. The mounting plate is concentrically arranged around the shaft collar and includes a first surface, a second surface, and an attachment mechanism. The first enclosure is removably coupled to the first surface of the mounting plate and the second enclosure is removably coupled to the second surface of the mounting plate. The attachment mechanism of the mounting plate extends radially beyond an outer edge of both the first enclosure and the second enclosure.

9 Claims, 3 Drawing Sheets

100
130
131
150
120
123
121
110
113
111
160
140
141
101

(56) References Cited

U.S. PATENT DOCUMENTS

| | | | | |
|---|---|---|---|---|
| 5,213,292 | A * | 5/1993 | Evans | B23Q 11/0025 248/123.11 |
| 2006/0179806 | A1 * | 8/2006 | Maier | A01G 3/08 56/12.7 |
| 2019/0160604 | A1 * | 5/2019 | Weinberg | B26D 3/166 |

FOREIGN PATENT DOCUMENTS

| | | | | |
|---|---|---|---|---|
| CN | 108796695 | A | 11/2018 | |
| DE | 3535601 | A1 * | 4/1987 | B23B 31/08 |
| DE | 10143380 | C1 * | 11/2002 | B25H 1/0028 |
| DE | 102017100767 | A1 * | 7/2018 | F16C 25/083 |
| GB | 365697 | | 1/1932 | |

OTHER PUBLICATIONS

Machine Translation, DE 102017100767 A1, Jul. 19, 2018. (Year: 2018).*

* cited by examiner

INLINE TOOL HOLDERS

TECHNICAL FIELD

The present specification generally relates to apparatuses for holding tools and, more specifically, apparatuses for attaching an inline tool to a spring balancer.

BACKGROUND

Assembly lines in a manufacturing process use a plurality of machines and tools to assemble a product, such as a vehicle. The relatively large mass of these tools, such as an inline pneumatic ratchet or an inline pneumatic hammer, and the extended operation time of assembly lines may place strain on operators that prevents the efficient assembly of the product. Accordingly, tools necessary for assembly may be suspended from spring balancers, also referred to as load balancers or tool balancers, which remove at least a portion of the force required to move and position the tools during operation of the assembly line. However, conventional means of attaching a tool to a spring balancer may result in interfaces that experience increased friction, which in turn results in increased wear and an inhibition of the movement of the tool. As a result, conventional attachment means at least partially counteract increased efficiency achieved when suspending a tool from a spring balancer.

Accordingly, there is an ongoing need for alternative apparatuses for attaching tools, such as those used on an assembly line, to spring balancers.

SUMMARY

In one or more embodiments, an inline tool holder may include a shaft collar, a mounting plate, a first enclosure, and a second enclosure. The mounting plate may be concentrically arranged around the shaft collar and may include a first surface, a second surface, and an attachment mechanism. The first enclosure may be removably coupled to the first surface of the mounting plate. The second enclosure may be removably coupled to the second surface of the mounting plate. The attachment mechanism of the mounting plate may extend radially beyond an outer edge of both the first enclosure and the second enclosure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
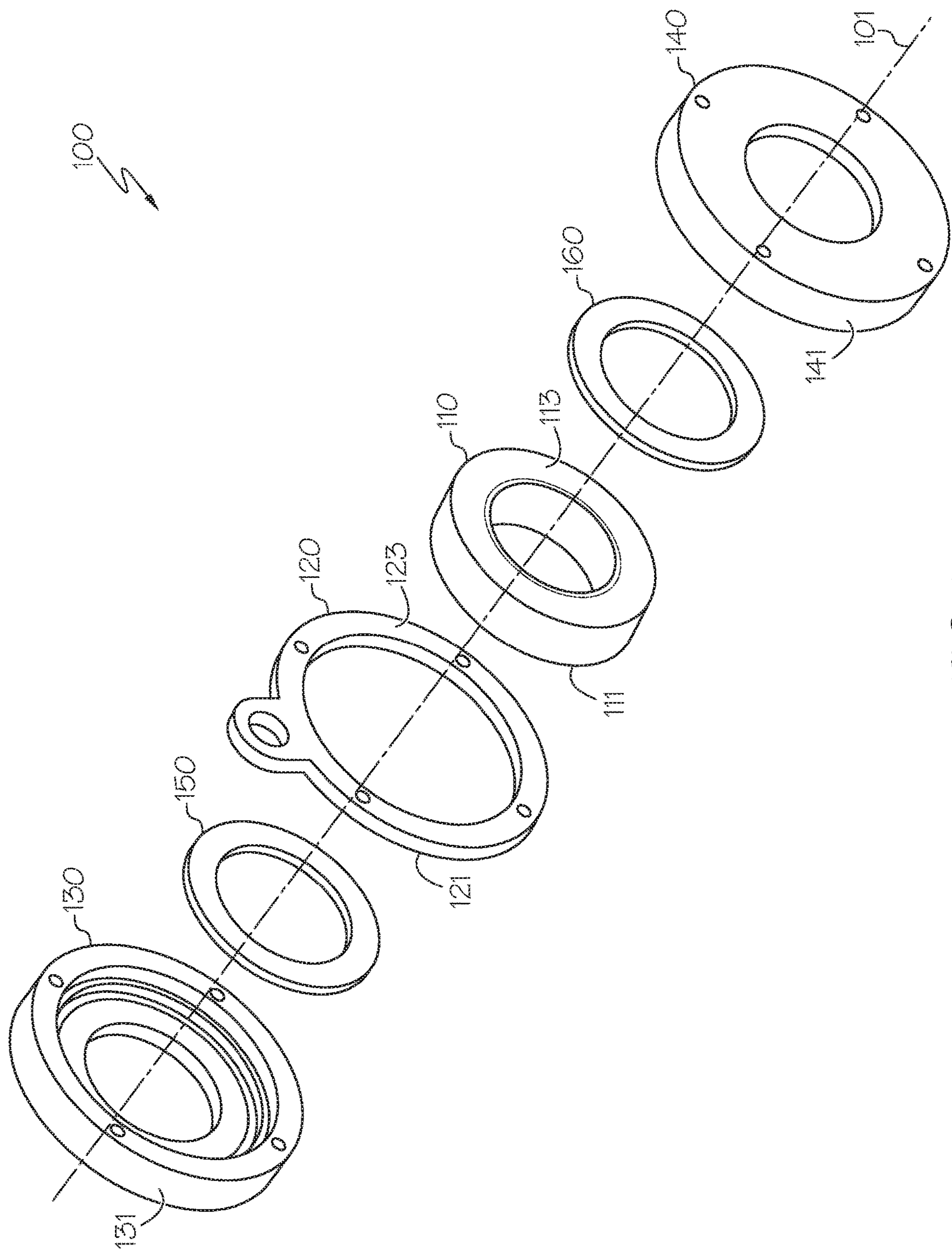
FIG. 1 schematically depicts an exploded view of an inline tool holder according to one or more embodiments shown and described herein.

FIG. 1 generally depicts an embodiment of an inline tool holder. The inline tool holder may generally include a shaft collar, a mounting plate, a first enclosure, and a second enclosure. As will be described in greater detail herein, the mounting plate may be concentrically arranged around the shaft collar and may include a first surface, a second surface, and an attachment mechanism. The first enclosure may be removably coupled to the first surface of the mounting plate and the second enclosure may be removably coupled to the second surface of the mounting plate. Furthermore, the attachment mechanism of the mounting plate may extend radially beyond an outer edge of both the first enclosure and the second enclosure such that the inline tool holder may be attached to a spring balancer or other mounting mechanism. In addition, the inline tool holder is designed such that the shaft collar, and any inline tool attached thereto, may freely rotate with minimal friction. Various embodiments of the inline tool holder will be described in greater detail herein.

Referring now to FIG. 1, an embodiment of an inline tool holder 100 is generally depicted. As illustrated, the inline tool holder 100 may include a shaft collar 110, a mounting plate 120, a first enclosure 130, a second enclosure 140, a first bearing 150, and a second bearing 160.

The shaft collar 110 may be annular-shaped with a central opening that is concentrically arranged around a central axis 101. The shaft collar may include a first surface 111 opposite a second surface 113. Additionally, the shaft collar 110 may include corresponding structures to removably couple the shaft collar 110 to a tool, such as an inline pneumatic tool. Accordingly, the diameter of the central opening may be selected with regard to the outer diameter of the central shaft of the desired inline pneumatic tool. The shaft collar 110 may be concentrically arranged around and/or removably coupled to the shaft of such an inline pneumatic tool. The shaft collar 110 may be disposed at any location of the shaft of such an inline pneumatic tool. The shaft collar 110 may be formed from any flexible, inflexible, elastic, or inelastic material known in the art, including, but not limited to, natural and synthetic rubbers, plastics, polymers, metals, and fibers. In embodiments, the material of the shaft collar 110 may be selected to correspond to the materials of the other components of the inline tool holder 100 such that friction at the component interfaces is reduced.

Figure 2:
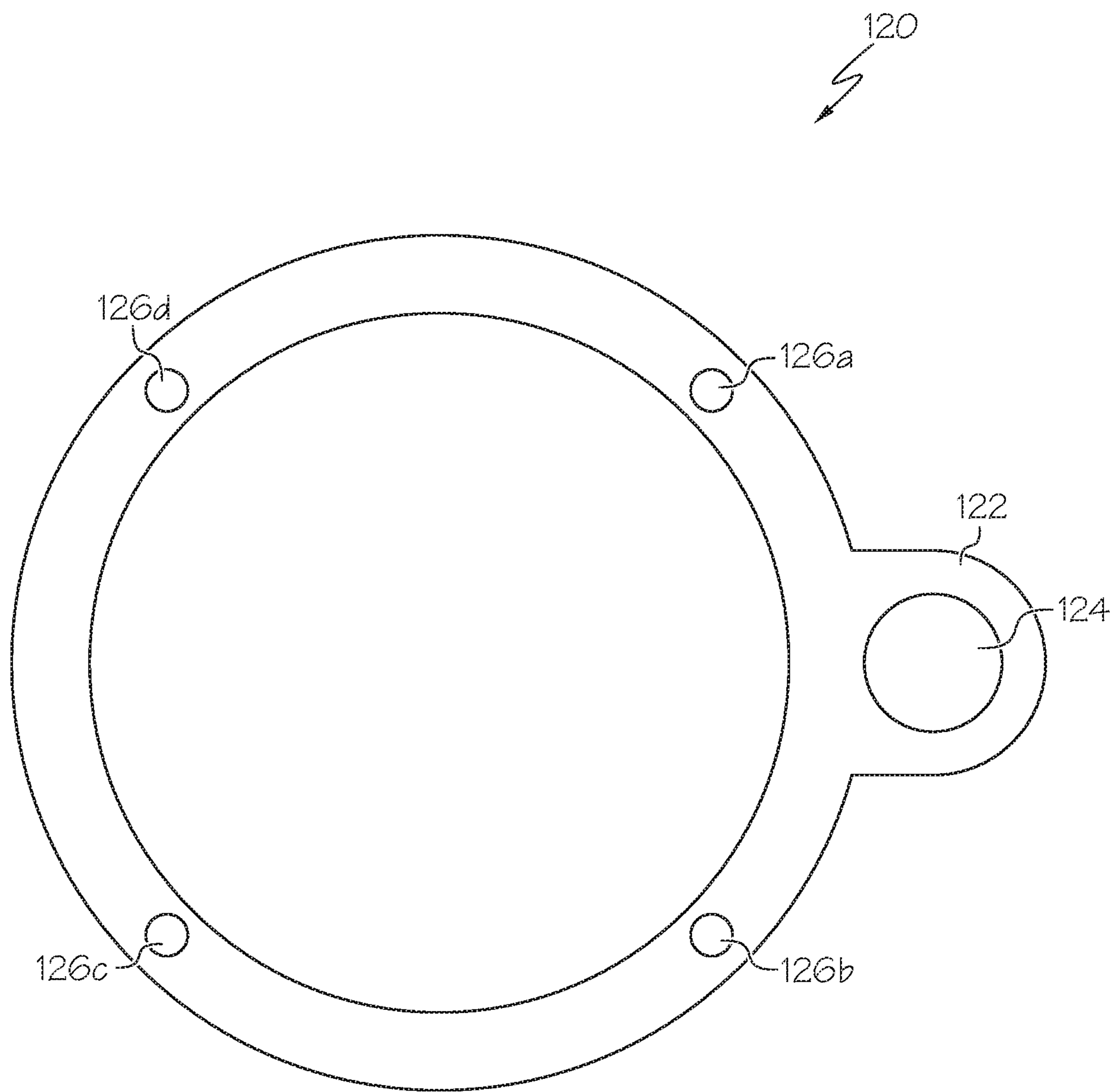
FIG. 2 schematically depicts a front view of a mounting plate according to one or more embodiments shown and described herein.

Referring now to FIG. 2, the mounting plate 120 may be annular-shaped to correspond to the shape of the shaft collar 110 and may include a central opening that is concentrically arranged around the central axis 101 and concentrically arranges around the shaft collar 110. Referring again to FIG. 1, the diameter of the central opening of the mounting plate 120 may correspond to the outer diameter of the shaft collar 110 such that the diameter of the central opening is substantially equal to the outer diameter of the shaft collar 110. Referring again to FIG. 2, the mounting plate 120 may include a first surface 121 opposite a second surface 123, and an attachment mechanism 122, which in turn may include an attachment opening 124. The attachment mechanism 122 and/or the attachment opening 124 may facilitate the attachment of the inline tool holder 100 to a balancing mechanism via a corresponding structure, such as a hook or clasp. Accordingly, the dimensions of the mounting plate 120 may be selected such that the attachment mechanism 122 and/or the attachment opening 124 extend radially beyond an outer edge 131 of the first enclosure 130 and an outer edge 141 of the second enclosure 140 described herein. Referring still to FIG. 2, the mounting plate 120 may include a plurality of mounting apertures 126*a*, 126*b*, 126*c*, 126*d*. In embodiments, the mounting apertures 126*a*-126*d* may include threaded or unthreaded throughbores suitable to receive a fastener, such as a screw or rivet. The mounting plate 120 may be formed from any flexible, inflexible, elastic, or inelastic material known in the art, including, but not limited to, natural and synthetic rubbers, plastics, polymers, metals, and fibers. In embodiments, the material of the mounting plate 120 may be selected to correspond to the materials of the other components of the inline tool holder 100 such that friction at the component interfaces is reduced.

Figure 3:
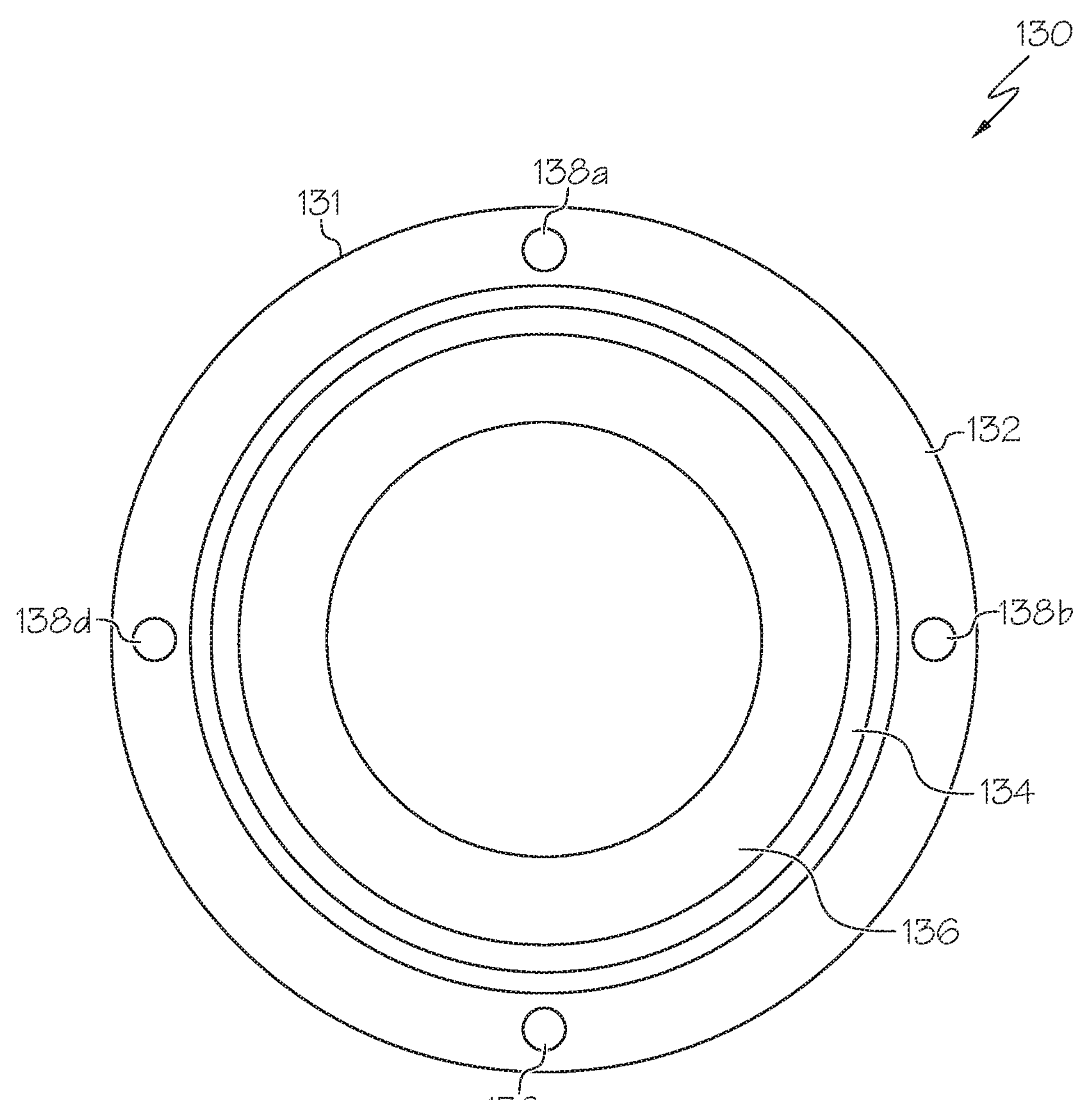
FIG. 3 schematically depicts a front view of an enclosure according to one or more embodiments shown and described herein.

Referring now to FIG. 3, the first enclosure 130 may be annular-shaped to correspond to the shape of mounting plate 120 and may include a central opening that is concentrically arranges around the central axis 101. Referring again to FIG. 1, the diameter of the central opening of the first enclosure 130 may correspond to the diameter of the central opening of the shaft collar 110 such that the diameter of the central opening of the first enclosure 130 is substantially equal to the diameter of the central opening of the shaft collar 110. Referring again to FIG. 3, the first enclosure 130 may include a plurality of recesses, such as a shaft collar recess 134 and a bearing recess 136. In embodiments, such recesses may facilitate the assembly of the inline tool 100. For example, the diameter and depth of the bearing recess 136 may correspond to the dimensions of the first bearing 150, described herein, such that the first bearing 150 may slot in the bearing recess 136 and be positioned substantially flush with the shaft collar recess 134. The depth and diameter of the shaft collar recess 134 may correspond to the dimensions of the shaft collar 110 such that a portion of the shaft collar 110 may slot in the shaft collar recess 134 when the inline tool holder 100 is assembled.

Referring still to FIG. 3, the first enclosure 130 may include a plurality of mounting apertures 138*a*, 138*b*, 138*c*, 138*d* disposed around an outer face 132. In embodiments, the mounting apertures 138*a*-138*d* may include threaded or unthreaded throughbores suitable to receive a fastener, such as a screw or rivet. The mounting apertures 138*a*-138*d* may facilitate the coupling of the first enclosure 130 to the mounting plate 120 as described herein. Accordingly, the positions of the mounting apertures 138*a*-138*d* may correspond to the positions of the mounting apertures 126*a*-126*d*. For example, the mounting apertures 138*a*-138*d* and the mounting apertures 126*a*-126*d* may be positioned such that the mounting aperture 126*a* and the mounting aperture 138*a* may receive a common fastener. The first enclosure 130 may be formed from any flexible, inflexible, elastic, or inelastic material known in the art, including, but not limited to, natural and synthetic rubbers, plastics, polymers, metals, and fibers. In embodiments, the material of the first enclosure 130 may be selected to correspond to the materials of the other components of the inline tool holder 100 such that friction at the component interfaces is reduced. In embodiments, the first enclosure 130 may comprise nylon.

Referring again to FIG. 1, the second enclosure 140 may be the same or substantially similar to the first enclosure 130 and may be oriented in a direction opposite of the first enclosure 130 such that the second enclosure 140 and the first enclosure 120 substantially mirror each other. Accordingly, the second enclosure 140 may be annular-shaped to correspond to the shape of the mounting plate 120 and may include a central opening that is concentrically arranged around the central axis 101. The diameter of the central opening of the second enclosure 140 may correspond to the diameter of the central opening of shaft collar 110 such that the diameter of the central opening of the second enclosure 140 is substantially equal to the diameter of the central opening of shaft collar 110. Furthermore, the second enclosure 140 may include a plurality of recesses, such as a shaft collar recess and a bearing recess, which are the same or substantially similar to the shaft collar recess 134 and the bearing recess 136, respectively. Accordingly, the diameter and depth of such recesses may correspond to the dimensions of the second bearing 160, described herein, and the shaft collar 110. The second enclosure 140 may include a plurality of mounting apertures disposed around an outer face. In embodiments, such mounting apertures may include threaded or unthreaded throughbores suitable to receive a fastener, such as a screw or rivet. These mounting apertures may facilitate the coupling of the second enclosure 140 to the mounting plate 120 as described herein. Accordingly, the positions of these mounting apertures may correspond to the positions of the mounting apertures 126*a*-126*d*. The second enclosure 140 may be formed from any flexible, inflexible, elastic, or inelastic material known in the art, including, but not limited to, natural and synthetic rubbers, plastics, polymers, metals, and fibers. In embodiments, the material of the second enclosure 140 may be selected to correspond to the materials of the other components of the inline tool holder 100 such that friction at the component interfaces is reduced. In embodiments, the second enclosure 140 may comprise nylon.

Referring again to FIG. 1, the first bearing 150 may be annular-shaped to correspond to the shape of the shaft collar 110 and may include a central opening that is concentrically arranged around the central axis 101. The diameter of the central opening of the first bearing 150 may correspond to the diameter of the central opening of the shaft collar 110 such that the diameter of the central opening of the first bearing 150 is substantially equal to the diameter of the central opening of the shaft collar 110. The dimensions of the first bearing 150 may correspond to the dimensions of the bearing recess 136 described hereinabove. The first bearing 150 may facilitate a reduction of friction experienced by the shaft collar 110 and/or disperse axial loads created by rotation of the shaft collar 110. The first bearing 150 may include any suitable bearing known in the art including, but not limited to, needle bearings, needle thrust bearings, and thrust ball bearings.

Referring still to FIG. 1, the second bearing 160 may be the same or substantially similar to the first bearing 150 and may be oriented in a direction opposite of the first bearing 150 such that the second bearing 160 and the first bearing 150 substantially mirror each other. Accordingly, the second bearing 160 may be annular-shaped to correspond to the shape of the shaft collar 110 and may include a central opening that is concentrically arranged around the central axis 101. The diameter of the central opening of the second bearing 160 may correspond to the diameter of the central opening of the shaft collar 110 such that the diameter of the central opening of the second bearing 160 is substantially equal to the diameter of the central opening of the shaft collar 110. The dimensions of the second bearing 160 may correspond to the dimensions of a bearing recess of the second enclosure 140 described hereinabove. The second bearing 160 may facilitate a reduction of friction experienced by the shaft collar 110 and/or disperse axial loads created by rotation of the shaft collar 110. The second bearing 160 may include any suitable bearing known in the art including, but not limited to, needle bearings, needle thrust bearings, and thrust ball bearings.

Embodiments of the inline tool holder 100 may be partially assembled by arranging the mounting plate 120 around the shaft collar 110. For example, the mounting plate 120 may be concentrically arranged around the shaft collar 110. In embodiments, the mounting plate 120 and the shaft collar 110 may include corresponding structures to allow these components to be arranged in a rotating engagement. The arrangement of the attachment plate 120 around the shaft collar 110 may utilize any structure and/or method known in the art. When arranged in a rotating engagement, the central openings of the mounting plate 120 and the shaft collar 110 are concentrically arranged around a common axis (e.g., the central axis 101). Accordingly, when arranged in a rotating engagement, the shaft collar 110 is secured within the attachment plate 120 and able to rotate freely in 360 degrees in either direction with respect to the attachment plate 120. The term "rotate freely" and/or "free rotation" are defined as continued rotation in any direction without an eventual stoppage of the rotation after a number of revolutions in a single direction.

Embodiments of the inline tool holder 100 may be further assembled by coupling the first enclosure 130 and the second enclosure 140 to the mounting plate 120. For example, first enclosure 130 may be removably coupled to a first surface 123 of the mounting plate 120 and the second enclosure 140 may be removably coupled to a second surface 121 of the mounting plate 120, which is disposed on the opposite side of the mounting plate 120. In embodiments, the first enclosure 130, the second enclosure 140, and the mounting plate 120 may include corresponding structures to allow these components to be coupled. For example, as described herein above, the mounting apertures of the first enclosure 130, the second enclosure 140, and the mounting plate 120 may be aligned such that fasteners, such as screws or rivets, may couple the first enclosure 130 and the second enclosure 140 to the mounting plate 120. When removably coupled, the central openings of the mounting plate 120, the first enclosure 130, and the second enclosure 140 are concentrically arranged around a common axis (e.g., the central axis 101). Accordingly, when coupled, the mounting plate 120, the first enclosure 130, and the second enclosure 140 encapsulate the shaft collar 110. Additionally, when coupled, the attachment mechanism 122 of the mounting plate 120 extends radially beyond the outer edge 131 of the first enclosure 130 and the outer edge 141 of the second enclosure 140. Accordingly, the attachment opening 124 of the attachment mechanism 122 also extends radially beyond the outer edge 131 of the first enclosure 130 and the outer edge 141 of the second enclosure 140. As described hereinabove, the attachment mechanism 122 facilitates the coupling of the inline tool holder 100 to a balancing mechanism, such as a spring balance or load balance.

Embodiments of the inline tool holder 100 may be further constructed by disposing the first bearing 150 between the first enclosure 130 and the shaft collar 110 and/or disposing the second bearing 160 between the second enclosure 140 and the shaft collar 110. The bearings may be disposed between the enclosures and the shaft collar 110 by slotting the bearing into the corresponding recess of the enclosure. For example, the first bearing 150 may be disposed between the first enclosure 130 and the first surface 111 of the shaft collar 110 by slotting the first bearing 150 within the bearing recess 136 and the second bearing 160 may be disposed between the second enclosure 140 and the second surface 113 of the shaft collar 110. Accordingly, when disposed between the shaft collar 110 and an enclosure, the bearings reduce friction between the shaft collar 110 and the enclosures such that the first enclosure 130 and/or the second enclosure 140 do not inhibit or eliminate the free rotation of the shaft collar 110 when coupled to the mounting plate 120. Additionally, when disposed between the shaft collar 110 and an enclosure, the bearings absorb axial loads produced by the rotation of the shaft collar 110 and distribute such loads into the stationary enclosure components.

It should now be understood that the embodiments described herein are directed to an inline tool holder that facilitates the attachment of an inline tool to a balancing mechanism. The construction of the inline tool holder allows for the free rotation of the shaft collar within the inline tool holder, which in turn allows for the free rotation of the inline tool within the inline tool holder. This free rotation reduces the wear experienced by the inline tool holder and, in turn, reduces inhibition of the movement of the inline tool that may occur as a result of the tool being attached to the balancing mechanism. As a result, the force required to move and positon the inline tool may be reduced during operation.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An inline tool holder comprising:

a shaft collar;

a mounting plate concentrically arranged around the shaft collar and comprising a first surface, a second surface, and an attachment mechanism;

a first enclosure removably coupled to the first surface of the mounting plate; and a second enclosure removably coupled to the second surface of the mounting plate, wherein the attachment mechanism of the mounting plate extends radially beyond an outer edge of both the first enclosure and the second enclosure;

the mounting plate, the first enclosure, and the second enclosure encapsulate the shaft collar:

the shaft collar, the mounting plate, the first enclosure, and the second enclosure each comprise an opening concentrically arranged around a common axis; and the attachment mechanism is freely rotatable around the common axis and the shaft collar is freely rotatable with respect to the mounting plate, the first enclosure, and the second enclosure.

2. The inline tool holder of claim 1, further comprising a first bearing disposed between a first surface of the shaft collar and the first enclosure and a second bearing disposed between a second surface of the shaft collar and the second enclosure.

3. The inline tool holder of claim 2, wherein the shaft collar, the mounting plate, the first enclosure, the second enclosure, the first bearing, and the second bearing each comprise an opening concentrically arranged around the common axis.

4. The inline tool holder of claim 2, wherein the first bearing and the second bearing each comprise a needle thrust bearing.

5. The inline tool holder of claim 1, wherein the first enclosure comprises nylon.

6. The inline tool holder of claim 1, wherein the second enclosure comprises nylon.

7. The inline tool holder of claim 1, wherein the attachment mechanism of the mounting plate is removably coupled to a balancing mechanism.

8. The inline tool holder of claim 1, wherein the shaft collar is removably coupled to a pneumatic tool.

9. The inline tool holder of claim 1, wherein the attachment mechanism comprises an attachment opening positioned radially beyond the outer edge of both the first enclosure and the second enclosure.

* * * * *

UNITED STATES PATENT AND TRADEMARK OFFICE
CERTIFICATE OF CORRECTION

PATENT NO. : 11,207,737 B2
APPLICATION NO. : 16/561932
DATED : December 28, 2021
INVENTOR(S) : David A. Britton and Charlie H. Reynolds Page 1 of 1

It is certified that error appears in the above-identified patent and that said Letters Patent is hereby corrected as shown below:

In the Claims

In Column 6, Line(s) 50, Claim 1, after "collar", delete ":" and insert --;--, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*